May 28, 1946.   W. P. LEAR   2,401,256
ELECTROMAGNETIC CENTRIFUGAL GOVERNOR
Filed Dec. 18, 1944

INVENTOR.
WILLIAM P. LEAR
BY Richard O. Manser
ATTORNEY

Patented May 28, 1946

2,401,256

UNITED STATES PATENT OFFICE 2,401,256

ELECTROMAGNETIC CENTRIFUGAL GOVERNOR

William P. Lear, North Hollywood, Calif., assignor, by mesne assignments, to Lear, Incorporated, Grand Rapids, Mich., a corporation of Illinois Application December 18, 1944, Serial No. 568,649

20 Claims. (Cl. 188—180)

This invention relates to a motor driving unit and more particularly to an improved magnetically restrained centrifugally operated brake.

The present invention is particularly adaptable to multiple actuator systems of the type described and claimed in my copending application Serial No. 490,136, filed June 9, 1943, for "Multiple actuator system," now Patent No. 2,366,734, issued January 9, 1945. As described and claimed in said patent, a plurality of motor driven actuators are mechanically interconnected so that in the event of the failure of the motor of one or more of the actuators, the actuators are operable by the motors of the remaining actuators. Alternatively, all the actuators may be operated manually. The said described system includes an electromagnetic clutch effective, upon energization of a motor, to connect the motor to its associated actuator and, upon deenergization of the motor, to disconnect it from its associated actuator.

The present invention on the other hand comprises a centrifugally operated magnetically restrained brake that may be interposed between the motor and the actuator in place of the clutch. This brake is adapted to be effectively disengaged upon energization of the motor to permit the actuator to be driven thereby. Upon deenergization of the motor, centrifugal means operate to engage the brake and effect rapid deceleration of the motor armature and stopping of the associated actuator. When the speed of the motor drops below a predetermined value, the engaging force upon the brake is released. Thereby, the motor and its associated actuator may be back driven manually or by motors associated with other actuators included in the system.

It is among the objects of this invention to provide a motor drive unit including means, effective upon deenergization of the motor, to rapidly decelerate the motor and release the motor and its driven system for free rotation after a predetermined interval; to provide a centrifugally operated magnetically restrained brake including a braking member magnetically disengaged from a braking surface upon energization of the motor and engaged with the braking surface by centrifugal means upon deenergization of the motor during only the period of deceleration of the motor; to provide such a brake operating as a speed governor during back driving of the motor associated therewith; to provide such a brake including a braking disk formed with means for increasing the frictional engagement thereof with a deformable braking surface; and to provide a combined centrifugally operated brake and speed governor particularly adapted for use in multiple actuator systems.

These and other objects, advantages and features of the invention will be apparent from the following description and the accompanying drawing. In the drawing.

Figure 1:
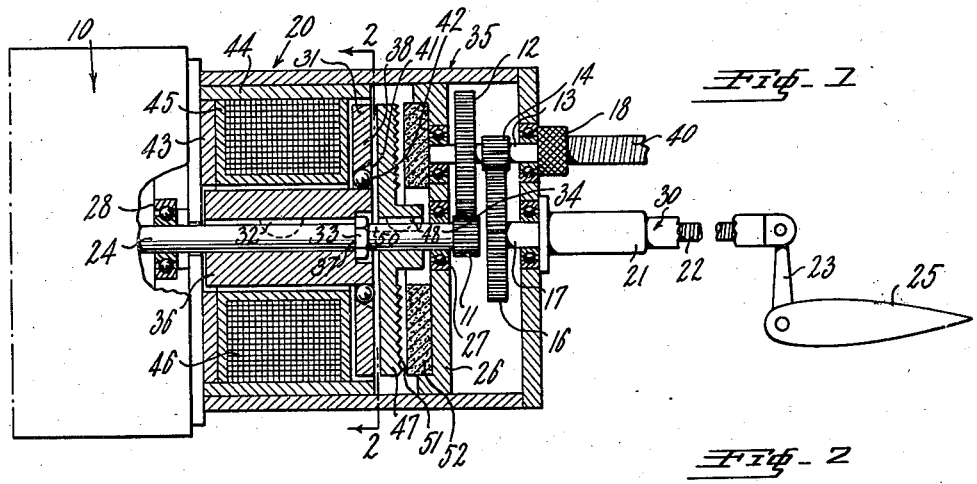
Fig. 1 is a schematic view, partly in section, illustrating a portion of a multiple actuator system embodying the invention.

Referring to the drawing, Fig. 1 is a schematic view of part of a multiple actuator system similar to the type shown and described in my said Patent No. 2,366,734. As shown, a motor 10 is connected through driving unit 20 of the invention to operate wing flap 25 through the medium of a linear actuator 30. Actuator 30 may be of the type described and claimed in my Patent No. 2,319,463 issued May 18, 1943, for "Mechanical actuator systems." Driving unit 20 is connected to actuator 30 through the medium of gearing contained in a gear housing 35, and flexible shafting 40 is likewise connected to the gearing in housing 35 whereby actuator 30 may be mechanically interconnected with other actuators for synchronous operation therewith in a manner described and claimed in my said Patent No. 2,366,734.

More specifically, the output pinion 11 of driving unit 20 engages a spur gear 12 on a shaft 13 mounted in bearings in gear housing 35. A pinion 14 on shaft 13 engages a spur gear 16 on a shaft 17 likewise mounted in bearings in gear housing 35. Shaft 13 is secured, through a coupling member 18, to flexible shafting 40. Actuator 30, as described in my said Patent No. 2,319,463, comprises a screw jack including relatively rotatable threaded members 21 and 22 actuating a crank arm 23 to operate wing flap 25. The arrangement is such that energization of motor 10 will relatively rotate members 21 and 22 to extend or retract actuator 30 thereby moving wing flap 25 to the desired position. As described in my said Patent No. 2,366,734, a manual operating device may be mechanically connected to shaft 40 whereby, in the event of failure of motor 10, actuator 30 may be manually operated.

Figures 2, 3:
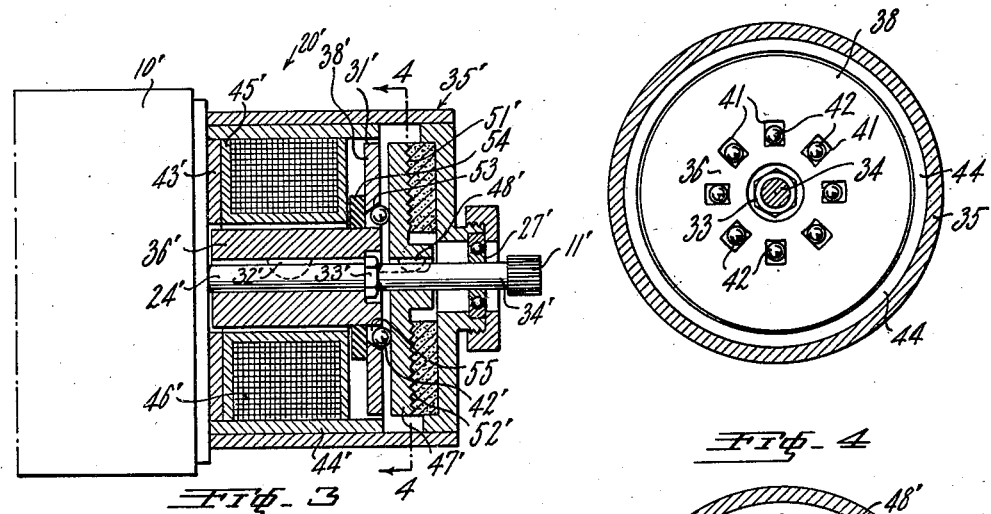
Fig. 2 is a view on the line 2—2 of Fig. 1, looking in the direction of the arrows.
Fig. 3 is a view similar to Fig. 1 showing a modification of the invention.

Referring more particularly to Figs. 1 and 2, motor 10 is illustrated as having an armature or driving shaft 24 on the outer end of which is driving pinion 11. Gear housing 25 is secured to the casing of motor 10 and encloses the driving unit of the invention. Housing 25 is provided with a traverse plate 26 containing a bearing 27 for supporting the outer end of shaft 24. The inner end of shaft 24 is rotatably supported in a bearing 28 in the motor casing.

A rotatable member 31 of magnetic material, is secured for rotation with shaft 24 by means of a key 32 and is held against longitudinal movement with respect to the shaft by a nut 33 threaded on an outer reduced portion 34 of shaft 24 and engaging a hub 36 forming part of member 31 and a shoulder 37 on shaft 11. Member 31 is of magnetic material and includes, in addition to hub 36, a disk 38 integral therewith. Adjacent hub 36, disk 38 is formed with a plurality of radially outwardly tapered slots 41 in which are mounted spherical members of magnetic material, such as steel balls 42, as shown more particularly in Fig. 2.

Slots 41 form air gaps in the magnetic path afforded by hub 36 and disk 38. The magnetic circuit is completed by an end plate 43 and a tubular member 44 both of magnetic material. A channel shaped winding support 45 is mounted inside member 44 and extends close to hub 36. A magnetizing winding 46 is mounted in support 45. The magnetic flux circuit includes hub 36, balls 42, disk 38, tubular member 44, plate 43 and thence back to hub 36. When winding 46 is energized, the magnetic flux created thereby retains balls 42 in slots 41, as these balls form part of the magnetic circuit by bridging the air gaps therein provided by slots 41.

Figures 4, 5:
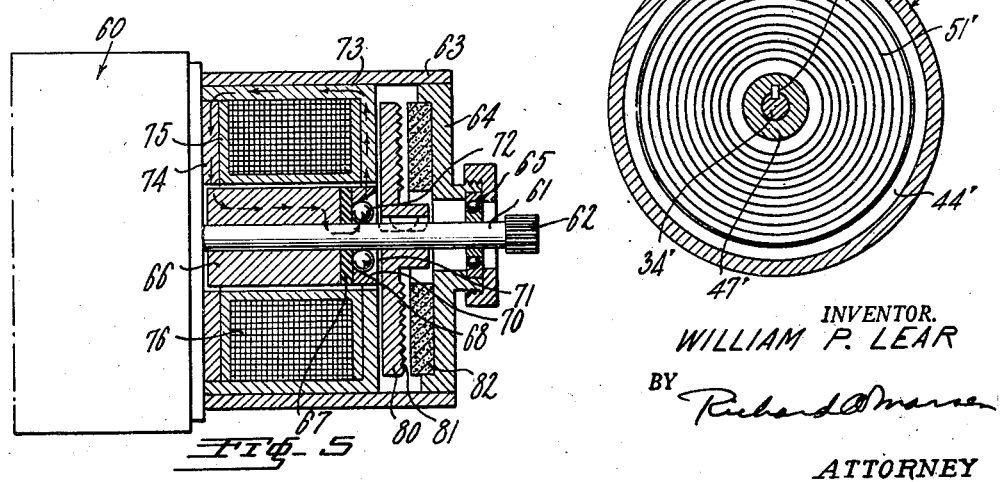
Fig. 4 is a view on the line 4—4 of Fig. 3, looking in the direction of the arrows.
Fig. 5 is a view similar to Figs. 1 and 3 illustrating a further modification of the invention.

A braking disk 47 is secured to reduced portion 34 of shaft 24 by a key 48 for rotation therewith. Key 48 engages an elongated keyway 50 in shaft 24 so that disk 47 is movable axially of the shaft. On the side of disk 47 opposite from member 31, a plurality of concentric ridges or grooves 51 are formed as shown in Fig. 4, and adapted to have deforming engagement with a relatively stationary deformable braking surface 52 fixedly mounted in end plate 26.

Winding 46 is preferably connected with motor 10. Upon energization of motor 10, braking disk 47 is drawn into magnetic and frictional coaction with disk 31 restraining balls 42 within slots or grooves 41. This condition continues during energization of motor 10. When rotating motor 10 is deenergized, winding 46 is deenergized simultaneously therewith. The magnetic flux circuit, restraining member 47 in enengagement with member 31, is broken, and balls 42 move outwardly in slots 41, under the influence of centrifugal force, to urge disk 31 into engagement with braking surface 52. This rapidly decelerates shaft 24 and any load member coupled to pinion 11. When the speed of the shaft drops below a predetermined value, the centrifugal force acting upon balls 42 is no longer sufficient to engage these balls with disk 47 to maintain the braking action. The balls accordingly fall back into grooves 41 releasing the braking pressure between brake disk 47 and brake surface 52. Shaft 24 and any load member may then be back driven through pinion 11 without the load of the brake being imposed thereon.

During such back driving, however, if the speed of shaft 24 exceeds a predetermined value, balls 42 will again move outwardly under the influence of centrifugal force to urge disk 47 into engagement with braking surface 52. The arrangement thus acts as a centrifugal governor during back driving of shaft 24 and when winding 46 is deenergized. The unit is thus particularly adapted for incorporation for multiple actuator systems of the type described and claimed in my said Patent No. 2,366,734. When incorporated in such system, the braking means is released during energization of motor 10. Upon deenergization of motor 10, shaft 24 is rapidly decelerated due to the braking action of disk 47. However, when the motor has substantially come to rest, the brake is released, and motor 10 and its associated actuator may be back driven by the motors associated with the other actuators or may be manually operated through the medium of flexible shafting 40, without the braking load being imposed thereon.

Fig. 3 illustrates a modified arrangement for providing the flux path for restraining the centrifugal balls. In Fig. 3, parts corresponding to those in Fig. 1 have been given the same reference characters primed. As shown, disk portion 38' of driving member 31' is formed separately from hub portion 36' thereof, and has a radially tapered inner periphery 53 which is larger in diameter than the external periphery of hub 36'. Disk 38' is secured to hub 36' by an annular member 54 of non-magnetic material such as brass or copper, or of plastic such as "Bakelite." The resulting arrangement provides an annular, radially tapered groove 55 forming a magnetic air gap between hub 36' and disk 38'.

The arrangement shown in Fig. 3 operates in the same manner as that shown in Fig. 1. Groove 55 provides an air gap in the magnetic circuit which is closed, during energization of winding 46', by the magnetic balls 42'. Accordingly, when winding 46' is energized, balls 42' are urged inwardly in groove 55. However, when winding 46' is deenergized and when the speed of shaft 24' is above a predetermined value, balls 42' move radially outwardly under the influence of centrifugal force to urge disk 47' into deforming engagement with braking surface 52' to arrest or slow down motion of shaft 24'. Fig. 3 shows braking disk 47' in engagement with braking surface 52' and illustrates how ridges 51' deform the deformable braking surface 52' which may be made of cork or some other similar resilient material.

Preferably, disk 47 as well as disk 47' is provided with a series of circumferential ridges or grooves 51 or 51'. These grooves deform braking surface 52 or 52' and thereby increase the effective braking action on shaft 24 or 24'. Due to the use of the grooves, the effective braking surface of the braking disk may be double or even triple, thereby providing for a greater braking effort to be attained when compared with the same size disk having a smooth braking surface.

Fig. 5 illustrates another embodiment of the invention, particularly exemplifying a modified formation of the magnetic flux path for the centrifugal balls. In this arrangement, a motor 60 is provided with an armature 61 having a driving pinion 62 thereon. A housing 63 is secured to the casing of motor 60 and provided with an end plate 64 containing a bearing 65 supporting the outer end of shaft 61.

A hub member 66 of magnetic material is secured to shaft 61 in any desired manner as by being shrunk on or otherwise secured thereto. Hub 66 is somewhat shorter in axial length than the hubs 36 and 36' of the embodiment shown in Figs. 1 through 4. An annular member or ring 67 of non-magnetic material is secured to the outer end of hub 66 and an annular member 68 of magnetic material is secured to member 67. Members 67 and 68 are equal in external diameter to that of hub 66. Member 68 is formed with a radially tapered inner periphery 70 which forms, with shaft 61, a radially tapered groove 71 for magnetic balls 72.

An angular member 73 of magnetic material is secured within housing 63 and is in magnetic circuit relation with an annular plate 74 disposed adjacent the inner end of hub 66. A channel shaped winding support 75 is mounted between member 73 and plate 74 and supports a magnetizing winding 76.

A braking disk 80 similar in construction to the braking disks 47 and 47' is slidably mounted on shaft 61 in the same manner as are disks 47 and 47'. Disk 80 is formed with a plurality of concentric grooves 81 adapted to have deforming engagement with a deformable stationary braking surface 82 mounted on end plate 64.

When winding 76 is energized, a magnetic path is completed as shown by the arrows. This path extends through hub 66 as far as non-magnetic member 67 and then passes into shaft 61 and through balls 72 into member 68. From thence, the magnetic flux path is through member 73 and plate 74 back into hub 66. The described embodiment of the invention works in exactly the same manner as these previously described. However, the efficiency of the magnetic circuit is improved over the two first described embodiments as the air gap is reduced. Likewise, a greater centrifugal force is needed to cause balls 72 to move outwardly in tapered groove 71 as these balls are rotated closer to the axis of rotation of shaft 61. Accordingly, the embodiment shown in Fig. 5 is better adapted for use with motors having a higher speed than those used with the embodiments of Figs. 1 and 3. As in the previously described embodiments, winding 76 may be connected in electric circuit relation with meter 60 so that it is energized to restrain the braking action of disk 80 until such time as the motor has been deenergized. Upon deenergization of the motor, member 80, in cooperation with braking surface 82 acts as a centrifugal governor for shaft 61 in the same manner as previously described.

While specific embodiments of the invention have been shown and described to illustrate the application of the principles thereof, it will be obvious that the invention may be otherwise embodied, without departing from such principles.

What is claimed is:

1. A driving unit comprising in combination, a rotatable member; a relatively fixed braking surface; speed responsive means effective, when the speed of said member is in excess of a predetermined value, to urge said member into engagement with said braking surface to arrest rotation of said member; and magnetic means effective, when energized, to render said means ineffective on said member, to provide unbraked rotation thereof.

2. A driving unit comprising, in combination, a rotatable member formed with a plurality of circular concentric ridges; a relatively fixed deformable braking surface; speed responsive means effective, when the speed of said member is in excess of a predetermined value, to urge said member into engagement with said braking surface to arrest rotation of said member, said ridges deforming said braking surface to increase the braking effect on said member; and magnetic means effective, when energized, to render said means ineffective on said member, to provide unbraked rotation thereof.

3. A driving unit comprising, in combination, a driving shaft; a rotatable member slidably mounted on said driving shaft for rotation therewith; a relatively fixed breaking surface stationary with respect to said driving shaft; speed responsive means effective, when the speed of said driving shaft exceeds a predetermined value, to engage said member and urge the same along said driving shaft into engagement with said braking surface to arrest rotation of said driving shaft; and magnetic means effective, when energized, to render said means ineffective on said member, to provide unbraked rotation of said driving shaft.

4. A driving unit comprising, in combination, a driving shaft; a rotatable member slidably mounted on said driving shaft for rotation therewith and formed with a plurality of circular concentric ridges on one face; a relatively fixed deformable braking surface stationary with respect to said driving shaft; speed responsive means effective when the speed of said driving shaft exceeds a predetermined value to engage said member and urge the same along said driving shaft into engagement with said braking surface to arrest rotation of said driving shaft, said ridges deforming said braking surface to increase the braking effect on said member; and magnetic means effective, when energized, to render said means ineffective on said member, to provide unbraked rotation of said driving shaft.

5. A driving unit comprising, in combination, a first rotatable member secured to a driving shaft; a second rotatable member slidably mounted on said driving shaft adjacent said first member for rotation therewith; a relatively fixed braking surface adjacent said second member; speed responsive means mounted on said first rotatable member and effective, when the speed of said members is in excess of a predetermined value, to engage said second member and urge the same along said driving shaft into engagement with said braking surface to arrest rotation of said members; and magnetic means effective, when energized, to render said means ineffective on said second member, to provide unbraked rotation of said members.

6. A driving unit comprising, in combination, a first rotatable member secured to a driving shaft; a second rotatable member slidably mounted on said driving shaft adjacent said first member and having a braking face formed with a plurality of circular concentric ridges; a relatively fixed deformable braking surface adjacent said second member; speed responsive means mounted on said first rotatable member and effective, when the speed of said members is in excess of a predetermined value, to engage said second member and urge the same along said driving shaft into engagement with said braking surface to arrest rotation of said members; said ridges deforming said braking surface to increase the braking effect on said second member; and magnetic means effective when energized, to render said means ineffective on said second member, to provide unbraked rotation of said members.

7. A driving unit comprising, in combination, a first rotatable disk of magnetic material arranged to be secured to a driving shaft; a second rotatable disk arranged to be slidably mounted on said driving shaft adjacent said first disk for rotation therewith; a relatively fixed braking surface adjacent said second disk; speed responsive means of magnetic material mounted on said first disk and effective, when the speed of said disks is in excess of a predetermined value, to engage said second disk and urge the same along said driving shaft into engagement with said braking surface to arrest rotation of said disks; and magnetic flux generating means effective, when energized, to retain said means in engagement with said first disk, to render said means ineffective on said second disk, to provide unbraked rotation of said disks.

8. A driving unit comprising, in combination, a first rotatable disk of magnetic material arranged to be secured to a driving shaft; a second rotatable disk arranged to be slidably mounted on said driving shaft adjacent said first disk and having a braking face formed with a plurality of circular concentric ridges; a relatively fixed deformable braking surface adjacent said second disk braking face; speed responsive means of magnetic material mounted on said first disk and effective, when the speed of said disks is in excess of a predetermined value to engage said second disk and urge the same along said driving shaft into engagement with said braking surface to arrest rotation of said disks; said ridges deforming said braking surface to increase the braking effect on said disks; and magnetic flux generating means effective, when energized, to retain said means in engagement with said first disk, to render said means ineffective on said second disk, to provide unbraked rotation of said disks.

9. A driving unit comprising, in combination, a first rotatable disk of magnetic material arranged to be secured to a driving shaft and formed with radially tapered slots, said slots forming high reluctance magnetic air gaps in said magnetic material; a second rotatable disk arranged to be slidably mounted on said driving shaft for rotation therewith and having a braking face; a housing member of magnetic material stationary with respect to and surrounding said first disk and extending close thereto to establish a relatively low reluctance magnetic air gap therewith; a relatively fixed braking surface adjacent said second disk braking face; speed responsive means of magnetic material movably mounted in said slots and effective to engage and urge said second disk into engagement with said braking surface to arrest motion of said shaft when the speed of said shaft is in excess of a predetermined value; and magnetic flux generating means, including a winding supported within said housing member, for producing magnetic flux for establishing engagement between speed responsive means and said first disk, to render said means ineffective on said second disk.

10. A driving unit comprising, in combination, a first rotatable disk of magnetic material arranged to be secured to a driving shaft and formed with radially tapered slots, said slots forming high reluctance magnetic air gaps in said magnetic material; a second rotatable disk arranged to be slidably mounted on said driving shaft for rotation therewith and having a braking face formed with a plurality of circular concentric ridges; a housing member of magnetic material stationary with respect to and surrounding said first disk and extending close thereto to establish a relatively low reluctance magnetic air gap therewith; a relatively fixed deformable braking surface adjacent said second disk braking face; speed responsive means of magnetic material movably mounted in said slots and effective to engage and urge said second disk into engagement with said braking surface to arrest motion of said shaft when the speed of said shaft is in excess of a predetermined value; said ridges deforming said braking surface to increase the braking effect on said shaft and disks; and magnetic flux generating means, including a winding supported within said housing member, for producing magnetic flux for establishing engagement between speed responsive means and said first disk, to render said means ineffective on said second disk.

11. A driving unit including a driving shaft; a first rotatable disk of magnetic material formed with radially tapered slots and having a hub secured to said driving shaft; a second rotatable disk slidably mounted on said driving shaft for rotation therewith and having a braking face; a housing member of magnetic material stationary with respect to and surrounding said first disk and said hub and extending close thereto to establish a relatively low reluctance magnetic air gap therewith; a relatively fixed braking surface adjacent said second disk braking face; speed responsive means of magnetic material movably mounted in said slots and effective to engage and urge said second disk into engagement with said braking surface to arrest motion of said shaft when the speed of said shaft is in excess of a predetermined value; and magnetic flux generating means, including a winding supported within said housing member for producing magnetic flux for establishing engagement between speed responsive means and said first disk, to retain said means ineffective on said second disk.

12. A driving unit including a driving shaft; a first rotatable disk of magnetic material formed with radially tapered slots and having a hub secured to said driving shaft; a second rotatable disk slidably mounted on said driving shaft for rotation therewith and having a braking face formed with a plurality of circular concentric ridges on one face; a housing member of magnetic material stationary with respect to and surrounding said first disk and said hub and extending close thereto to establish a relatively low reluctance magnetic air gap therewith; a relatively fixed deformable braking surface adjacent said second disk braking face; speed responsive means of magnetic material movably mounted in said slots and effective to engage and urge said second disk into engagement with said braking surface to arrest motion of said shaft when the speed of said shaft is in excess of a predetermined value; said ridges deforming said braking surface to increase the braking effect on said shaft and disks; and magnetic flux generating means, including a winding supported within said housing member, for producing magnetic flux for establishing engagement between speed responsive means and said first disk, to render said means ineffective on said second disk.

13. A driving unit including a driving shaft; a hub of magnetic material secured to said driving shaft for rotation therewith; an annular member of magnetic material having a bevelled inner periphery; a non-magnetic member securing said annular member to said hub; said non-magnetic member forming with said annular member an outwardly tapered circular groove and said groove providing a high reluctance magnetic air gap between said hub and annular member; a second member slidably mounted on said driving shaft adjacent said first member for rotation therewith; a relatively fixed braking surface adjacent said second member; speed responsive means of magnetic material movably mounted in said groove and effective to engage and urge said second member into engagement with said braking surface to arrest motion of said shaft when the speed of said shaft is in excess of a predetermined value; and magnetic means effective, when energized, to render said means ineffective on said second member.

14. A speed governing mechanism including a driving shaft; a hub of magnetic material secured to said driving shaft for rotation therewith; a disk of magnetic material having a bevelled inner periphery; a non-magnetic member securing said disk to said hub; said non-magnetic member forming with said hub and disk an outwardly tapered circular groove and said groove providing a high reluctance magnetic air gap between said hub and disk; a second disk slidably mounted on said driving shaft adjacent said first disk for rotation therewith; a relatively fixed braking surface adjacent said second disk; speed responsive means of magnetic material movably mounted in said groove and effective to engage and urge said second disk into engagement with said braking surface to arrest motion of said shaft when the speed of said shaft is in excess of a predetermined value; and magnetic means effective, when energized, to render said means ineffective on said second disk.

15. A driving unit including a driving shaft; a hub of magnetic material secured to said driving shaft for rotation therewith; an annular member of magnetic material having a bevelled inner periphery; a non-magnetic member securing said annular member to said hub; said non-magnetic member forming with said annular member an outwardly tapered circular groove and said groove providing a high reluctance magnetic air gap between said hub and annular member; a second member slidably mounted on said driving shaft adjacent said first member for rotation therewith and having a braking face formed with a plurality of circular concentric ridges; a relatively fixed deformable braking surface adjacent said braking face of said second member; speed responsive means of magnetic material movably mounted in said groove and effective to engage and urge said second member into engagement with said braking surface to arrest motion of said shaft when the speed of said shaft is in excess of a predetermined value; said ridges deforming said braking surface to increase the braking effect on said shaft; and magnetic means effective, when energized, to render said means ineffective on said second member.

16. A speed governing mechanism including a driving shaft; a hub of magnetic material secured to said driving shaft for rotation therewith; a disk of magnetic material having a bevelled inner periphery; a non-magnetic member securing said disk to said hub; said non-magnetic member forming with said hub and disk an outwardly tapered circular groove and said groove providing a high reluctance magnetic air gap between said hub and disk; a second disk slidably mounted on said driving shaft adjacent said first disk for rotation therewith and having a braking face formed with a plurality of circular concentric ridges; a relatively fixed deformable braking surface adjacent said second disk; speed responsive means of magnetic material movably mounted in said groove and effective to engage and urge said second disk into engagement with said braking surface to arrest motion of said shaft when the speed of said shaft is in excess of a predetermined value; said ridges deforming said braking surface to increase the braking effect on said shaft; and magnetic means effective, when energized, to render said means ineffective on said second disk.

17. A driving unit including a driving shaft; a hub of magnetic material secured to said driving shaft for rotation therewith; an annular member of magnetic material having a bevelled inner periphery; a non-magnetic member securing said annular member to said hub; said non-magnetic member forming with said annular member an outwardly tapered circular groove and said groove providing a high reluctance magnetic air gap between said hub and annular member; a second member slidably mounted on said driving shaft adjacent said first member for rotation therewith; an annular inwardly facing channel of magnetic material stationary with respect to and surrounding said first member and said hub; a relatively fixed braking surface adjacent said second member; speed responsive means of magnetic material movably mounted in said groove and effective to engage and urge said second member into engagement with said braking surface to arrest motion of said shaft when the speed of said shaft is in excess of a predetermined value; and magnetic flux generating means, including a winding supported within said channel member, for producing magnetic flux for establishing engagement between said speed responsive means and said annular member, to render said means ineffective on said second member.

18. A driving unit including a driving shaft; a hub of magnetic material secured to said driving shaft for rotation therewith; an annular member of magnetic material having a bevelled inner periphery; a non-magnetic member securing said annular member to said hub; said non-magnetic member forming with said annular member an outwardly tapered circular groove and said groove providing a high reluctance magnetic air gap between said hub and annular member; a second member slidably mounted on said driving shaft adjacent said first member for rotation therewith and having a braking face formed with a plurality of circular concentric ridges; an annular inwardly facing channel of magnetic material stationary with respect to and surrounding said first member and said hub; a relatively fixed deformable braking surface adjacent said second member; speed responsive means of magnetic material movably mounted in said groove and effective to engage and urge said second member into engagement with said braking surface to arrest motion of said shaft when the speed of said shaft is in excess of a predetermined value; said ridges deforming said braking surface to increase the braking effect on said shaft; and magnetic flux generating means, including a winding supported within said channel member, for producing magnetic flux for establishing engagement between said speed responsive means and said annular member, to render said means ineffective on said second member.

19. A driving unit including a driving shaft; a first disk secured to said driving shaft for rotation therewith; a second disk slidably mounted on said driving shaft adjacent said first disk for rotation therewith; a relatively fixed deformable braking surface adjacent said second disk; speed responsive means mounted between said disks and effective to urge said second rotatable disk into engagement with said braking surface to arrest motion of said shaft when the speed of said shaft is in excess of a predetermined value; and selectively operable mechanism effective to render said means ineffective on said second disk, to provide unbraked rotation of said driving shaft.

20. A driving unit including a driving shaft; a first disk secured to said driving shaft for rotation therewith; a second disk slidably mounted on said driving shaft adjacent said first disk for rotation therewith and formed with a plurality of circular concentric ridges on one face; a relatively fixed deformable braking surface adjacent said second disk; speed responsive means mounted between said disks and effective to urge said second rotatable disk into engagement with said braking surface to arrest motion of said shaft when the speed of said shaft is in excess of a predetermined value; said ridges deforming said braking surface to increase the braking effect on said shaft; and selectively operable electromagnetic mechanism effective to render said means ineffective on said second disk, to provide unbraked rotation of said driving shaft.

WILLIAM P. LEAR.